United States Patent
Heibel et al.

(10) Patent No.: US 10,720,253 B2
(45) Date of Patent: Jul. 21, 2020

(54) APPARATUS FOR PLANTING AND HARVESTING RADIOISOTOPES ON A MASS PRODUCTION BASIS

(71) Applicant: Westinghouse Electric Company LLC, Cranberry Township, PA (US)

(72) Inventors: Michael D. Heibel, Harrison City, PA (US); Luke D. Czerniak, Mount Pleasant, PA (US); Melissa M. Heagy, Butler, PA (US); Jorge V. Carvajal, Irwin, PA (US); Matthew D. McArdle, Murrysville, PA (US); Jeffrey J. Taylor, Pittsburgh, PA (US); James L. Yankel, Trafford, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 325 days.

(21) Appl. No.: 15/729,745

(22) Filed: Oct. 11, 2017

(65) Prior Publication Data

US 2019/0108921 A1    Apr. 11, 2019

(51) Int. Cl.
G21C 23/00    (2006.01)
G21G 1/02     (2006.01)
G21C 17/108   (2006.01)

(52) U.S. Cl.
CPC .............. *G21C 23/00* (2013.01); *G21G 1/02* (2013.01); *G21C 17/108* (2013.01)

(58) Field of Classification Search
CPC ........ G21C 23/00; G21C 1/303; G21C 1/306; G21G 1/02
See application file for complete search history.

(56) References Cited

U.S. PATENT DOCUMENTS

| | | |
|---|---|---|
| 3,932,211 A | 1/1976 | Loving, Jr. |
| 2011/0051874 A1 | 3/2011 | Allen et al. |
| 2013/0170927 A1 | 7/2013 | Dayal et al. |
| 2016/0012928 A1 | 1/2016 | Guler et al. |

FOREIGN PATENT DOCUMENTS

| | | |
|---|---|---|
| KR | 10-2001-0038718 A | 5/2001 |
| KR | 10-2015-0084373 A | 7/2015 |

OTHER PUBLICATIONS

International Search Report and Written Opinion Issued for PCT/US2018/050877, dated May 21, 2019.
Heibel,. M. et al., U.S. Appl. No. 15/210,231, filed Jul. 14, 2016,"Irradiation Target Handling Device," 16 pages.
Heibel, M., U.S. Appl. No. 15/341,478, filed Nov. 2, 2016, System and Process for Production and Collection of Radioisotopes, 18 pages.

*Primary Examiner* — Sharon M Davis
(74) *Attorney, Agent, or Firm* — K&L Gates LLP

(57) ABSTRACT

A method and apparatus for modifying an existing nuclear reactor moveable in-core detector system to insert and withdraw target specimens from a reactor core during reactor operation without practically impeding the moveable in-core detector system's ability to obtain flux maps of the core throughout the reactor's operation. The apparatus provides a separate drive unit and delivery cable that is independent of the detector drive system, but uses most of the same core delivery conduits to access the core. A specimen holder is remotely detachable from the delivery cable when appropriately positioned and can be remotely reattached for withdrawal after a scheduled period of radiation.

7 Claims, 4 Drawing Sheets

APPARATUS FOR PLANTING AND HARVESTING RADIOISOTOPES ON A MASS PRODUCTION BASIS

BACKGROUND

1. Field

This invention pertains generally to methods and devices for the insertion and removal of radioactive isotopes into and out of a nuclear core and, more particularly, to the insertion and removal of such isotopes into and out of a commercial nuclear reactor on a mass production basis without reducing the reactor's facilities ability to generate electricity.

2. Related Art

The commercial production of radioactive isotopes for medical and other commercial enterprises, such as Radio-isotope Thermal Generators (RTG), is a process which is limited by the very high costs associated with developing the neutron source infrastructure required to create commercial quantities of the useful isotopes. This makes the useful applications of these radioactive isotopes very expensive and subject to extreme supply and cost fluctuations due to actual or perceived potential interruptions at the very limited number of isotope production facilities available. The human cost associated with this situation is that most people are not able to afford the cost of the medical benefits that can be provided by the large number of available radioactive isotope diagnostic and treatment modalities.

Furthermore, the reactors that are currently used to produce the radioisotopes that are processed to produce radiopharmaceuticals are very old, and continued operation requires very expensive upgrades that appear to provide poor return on investment. Consequently, the reactor resources required to maintain existing production capability is disappearing. The fundamental issue to be addressed is the loss of medical radioisotope production capability due to obsolescence issues in the existing medical radioisotope production infrastructure that will lead to a shortage of the radioisotopes needed to diagnose and treat serious medical issues. Accordingly, a need exists for an alternative, and preferably less expensive, way of producing radioisotopes.

A number of operating nuclear reactors used in commercial electrical generation facilities employ a moveable in-core detector system such as the one described in U.S. Pat. No. 3,932,211, to periodically measure the axial and radial power distribution within the core. The moveable detector system generally comprises four, five or six detector/drive assemblies, depending upon the size of the plant (two, three or four loops), which are interconnected in such a fashion that they can assess various combinations of in-core flux thimbles. To obtain the thimble interconnection capability, each detector has associated with it a five or six-path and ten or fifteen-path rotary mechanical transfer device. A core map is made by selecting, by way of the transfer devices, particular thimbles through which the detectors are driven. To minimize mapping time, each detector is capable of being run at high speed (72 feet per minute) from its withdrawn position to a point just below the core. At this point, the detector speed is reduced to 12 feet per minute and the detector traversed to the top of the core, direction reversed, and the detector traversed to the bottom of the core. The detector speed is then increased to 72 feet per minute and the detector is moved to its withdrawn position. A new flux thimble is selected for mapping by rotating the transfer devices and the above procedure repeated.

FIG. 1 shows the basic system for the insertion of the movable miniature detectors. Retractable thimbles 10, into which the miniature detectors 12 are driven, take the routes approximately as shown. The thimbles are inserted into the reactor core 14 through conduits extending from the bottom of the reactor vessel 16 through the concrete shield area 18 and then up to a thimble seal table 20. Since the movable detector thimbles are closed at the leading (reactor) end, they are dry inside. The thimbles, thus, serve as a pressure barrier between the reactor water pressure (2500 psig design) and the atmosphere. Mechanical seals between the retractable thimbles and the conduits are provided at the seal table 20. The conduits 22 are essentially extensions of the reactor vessel 16, with the thimbles allowing the insertion of the in-core instrumentation movable miniature detectors. During operation, the thimbles 10 are stationary and will be retracted only under depressurized conditions during refueling or maintenance operations. Withdrawal of a thimble to the bottom of the reactor vessel is also possible if work is required on the vessel internals.

The drive system for insertion of the miniature detectors includes, basically, drive units 24, limit switch assemblies 26, five-path rotary transfer devices 28, 10-path rotary transfer devices 30, and isolation valves 32, as shown. Each drive unit pushes a hollow helical wrap drive cable into the core with a miniature detector attached to the leading end of the cable and a small diameter coaxial cable, which communicates the detector output, threaded through the hollow center back to the trailing end of the drive cable.

The use of the moveable in-core detector system flux thimbles 10 for the production of irradiation desired neutron activation and transmutation products, such as isotopes used in medical procedures, requires a means to insert and withdraw the material to be irradiated from inside the flux thimbles located in the reactor core 14. Preferably, the means used minimizes the potential for radiation exposure to personnel during the production process and also minimizes the amount of radioactive waste generated during this process. In order to precisely monitor the neutron exposure received by the target material to ensure the amount of activation or transmutation product being produced is adequate, it is necessary for the device to allow an indication of neutron flux in the vicinity of the target material to be continuously measured. Ideally, the means used would be compatible with systems currently used to insert and withdraw sensors within the core of commercial nuclear reactors. Co-pending U.S. patent application Ser. No. 15/210,231, entitled Irradiation Target Handling Device, filed Jul. 14, 2016, describes an Isotope Production Cable Assembly that satisfies all the important considerations described above for the production of medical isotopes that need core exposure for less than a full fuel cycle.

There are other commercially valuable radioisotopes that are produced via neutron transmutation that require multiple neutron induced transmutation reactions to occur in order to produce the desired radioisotope product, or are derived from materials having a very low neutron interaction cross section, such as Co-60, W-188, Ni-63, Bi-213 and Ac-225. These isotopes require a core residence time of a fuel cycle or more. Commercial power reactors have an abundance of neutrons that do not significantly contribute to the heat output from the reactor used to generate electrical power. This invention describes a process and associated hardware that may be used to utilize the neutron environment in a commercial nuclear reactor to produce commercially valuable quantities of radioisotopes that require long-term neutron exposure, i.e., a fuel cycle or longer, or short term exposure, i.e., less than one fuel cycle, with minimal impact on reactor operations and operating costs. The hardware and methodology described in U.S. patent application Ser. No. 15/341,478, filed Nov. 2, 2016, will enable the production of radioisotopes that require relatively long residence times in the core, currently produced in outdated isotope production reactors, using the foregoing moveable in-core detector system equipment without interfering with the functionality of the moveable in-core detector system power distribution measurement process.

There is still a further need for a more efficient radioisotope production process that can produce radioisotopes in commercial nuclear reactors on a mass production scale, without negatively impacting the electrical power output of those commercial facilities. It is an object of this invention to satisfy that need.

SUMMARY

This and other objects are achieved, in accordance with this invention, with an irradiation target handling system having an isotope production cable assembly comprising a target holder drive cable constructed to be compatible with conduits of an existing nuclear reactor moveable in-core detector system that convey in-core detectors from a detector drive system to and through instrument thimbles within a reactor core. The target holder drive cable has a remotely controlled one of a male or female coupling on a leading end of the drive cable. A target holder drive cable drive motor unit is provided separate from and independent of the detector drive unit on the existing nuclear reactor moveable in-core detector system. The target holder drive cable drive motor unit is configured to drive the target holder drive cable into and out of the core and is structured to drive the target holder drive cable into and through the conduits, a first multipath selector and a second multipath selector on the existing nuclear reactor moveable in-core detector system. A specimen target holder is provided having another of the male or female coupling on a trailing end of the specimen target holder with the another of the male or female coupling configured to mate with the one of the male or female coupling on the leading end of the target holder drive cable. A third multipath selector is connected to and structured to receive an input from an outlet path on the second multipath selector and provides a first output to a new specimen attachment location, a second output to an irradiated specimen offloading location and a third output to the core.

In one embodiment the specimen target holder has a radial projection extending from or through an outside wall of the specimen target holder into contact with an interior wall of an instrument thimble in the reactor core, into which the specimen target holder is driven by the target holder drive cable, which maintains an axial position of the specimen holder within the instrument thimble, when the specimen holder is detached from the drive cable. Preferably, the one of the male or female coupling is configured to move the radial projection away from the interior wall of the instrument thimble when coupled to another of the male or female coupling on the specimen target holder.

In still another embodiment the irradiation target handling system includes an axial positioning device attached to the specimen target holder for determining when the specimen target holder achieves a preselected axial position within an instrument thimble within the core, which the specimen target holder is driven into by the drive cable. Preferably, the instrument thimbles have a closed upper end and a leading end of the specimen target holder has an axial projection that is sized to contact an interior of the closed upper end of the instrument thimble into which the specimen target holder is driven. In one such embodiment the length of the axial projection is a wire having an adjustable length. Desirably, the target holder drive cable enters the conduits through a "Y" connection with one leg of the "Y" connected to the target holder drive cable drive motor unit and a second leg of the "Y" connected to the detector drive unit.

The invention also contemplates a method of irradiating multiple specimens within a core of a nuclear reactor that has a moveable in-core, radiation detector flux mapping system, wherein the core comprises a plurality of fuel assemblies respectively having instrument thimbles into which a radiation detector of the flux mapping system can be inserted and travel through. The method comprises the step of inserting a first specimen holder containing a first specimen at a lead end of a first drive cable driven by a first drive unit, into a first instrument thimble in the core. Next, the method remotely detaches the first drive cable from the first specimen holder and fixes an axial position of the first specimen holder within the first instrument thimble. Then the first drive cable is withdrawn from the reactor. Next, a second specimen holder containing a second specimen is attached to the lead end of the first drive cable driven by the first drive unit. The second specimen holder containing the second specimen is then inserted into a second instrument thimble in the core. The first drive cable is next remotely detached from the second specimen holder and the second specimen holder is fixed at an axial position that it was driven to within the second instrument thimble. The next step withdraws the first drive cable from the reactor. In between the withdrawing step and the second inserting step, the method inserts a moveable in-core radiation detector from the moveable in-core detector radiation flux mapping system, attached to a second drive cable driven by a second drive unit, into and through a third instrument thimble and withdraws the moveable in-core radiation detector from the reactor after performing a flux mapping exercise.

In one embodiment of the method, the inserting steps insert specimen holders into as many as half the instrument thimbles accessible by the flux mapping system for simultaneous irradiation at a time when a flux map is to be conducted. Preferably, the steps of fixing the axial position of the specimen holders within the respective instrument thimbles includes the steps of determining when the respective specimen holders are at a preselected axial position within the corresponding instrument thimbles. In one such embodiment, the step of withdrawing the first drive cable from the reactor comprises withdrawing the first drive cable out of the moveable in-core, radiation detector flux mapping system prior to the running of a flux map.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
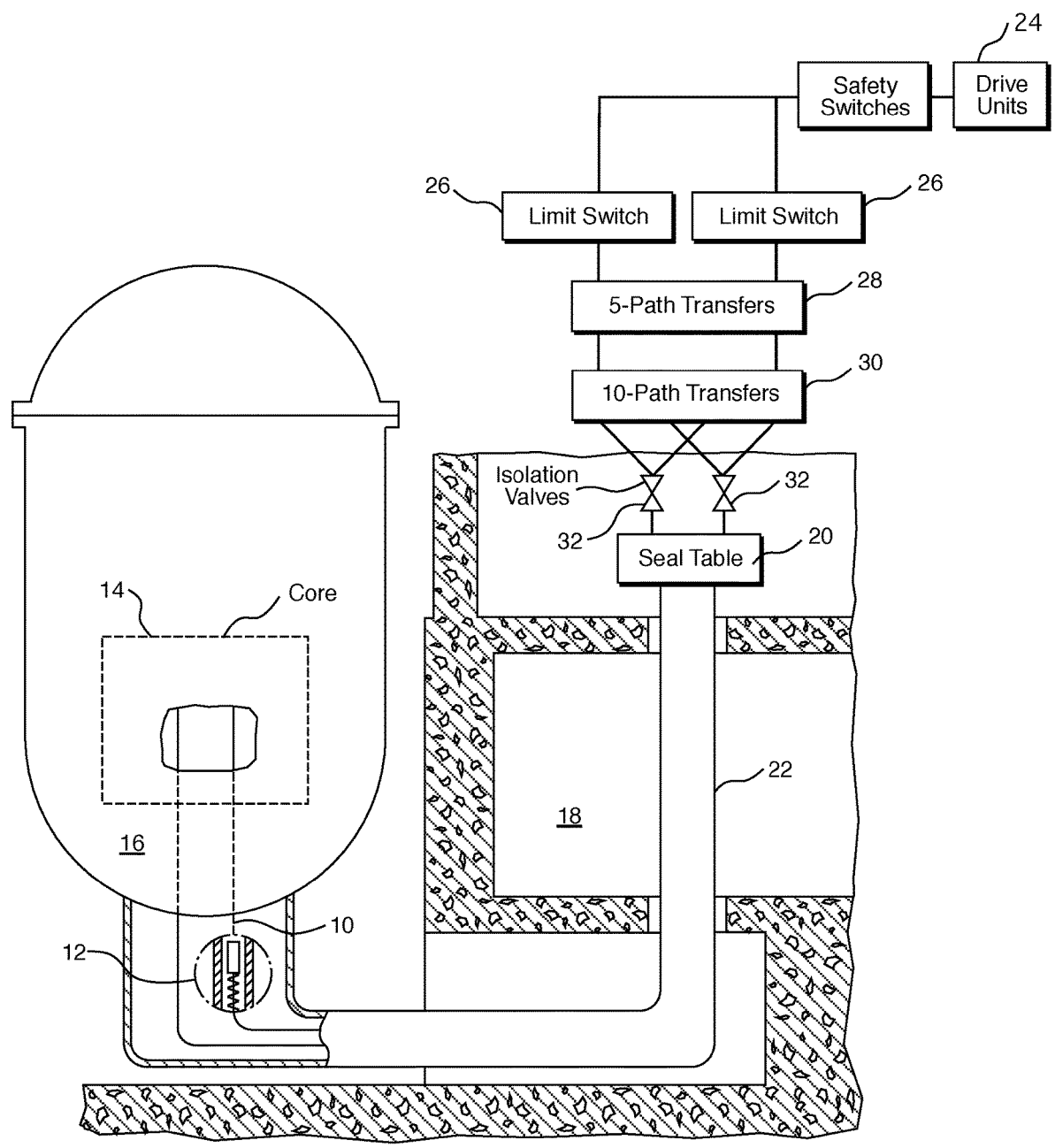
FIG. 1 is a schematic, elevational view, partially in section, illustrating the basic flux mapping system that can be employed in accordance with this invention to produce a plurality of target isotopes.
Figure 2:
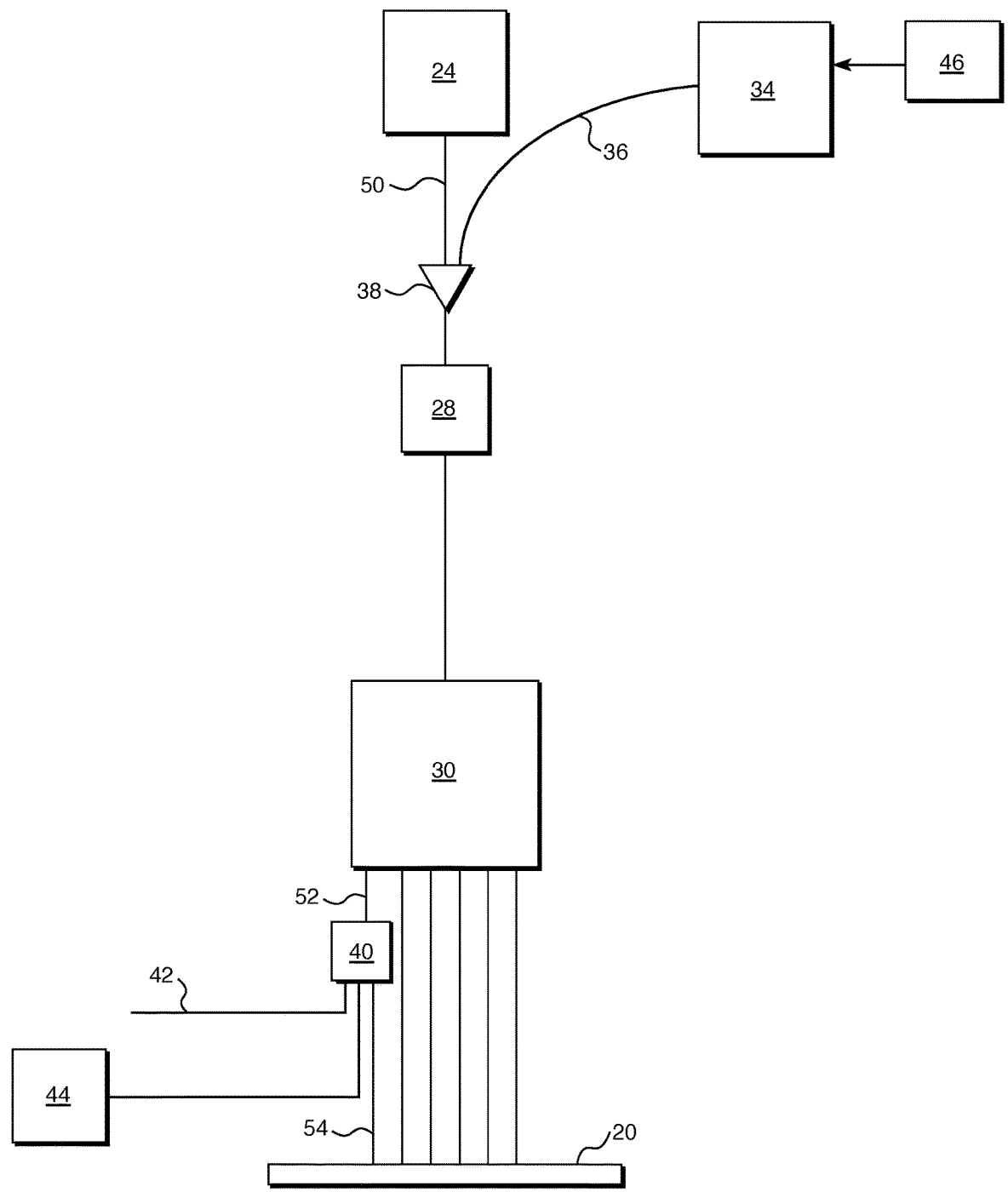
FIG. 2 is a schematic view of a modification to the flux mapping system shown in FIG. 1 to configure the apparatus to perform the method of this invention.

To accomplish the foregoing objectives, this invention modifies the traditional flux mapping system described above with respect to FIG. 1, as shown in FIG. 2. FIG. 2 shows a portion of the moveable in-core detector flux mapping system containing the detector drive unit 24, the five-path transfer device 28, the ten-path transfer device 30 and the seal table 20 in schematic form with the incidental components, like the limit switches, safety switches and isolation valves omitted. Also shown in FIG. 2 are the core components of the modifications introduced by this invention to the moveable in-core detector flux mapping system, to convert the moveable in-core detector flux mapping system into a radioisotope mass production facility, without compromising the flux mapping function. In accordance with this invention a specimen holder cable drive unit 34 is provided that is distinct and independent of the detector drive unit 24. The specimen holder cable drive unit 34 drives a specimen holder drive cable 36 that has a specimen holder 48 detachably attached to the lead end of the specimen holder drive cable 36. The specimen holder 48 is shown in and will be described in more detail with regard to FIG. 3. It should also be appreciated that the specimen holder cable drive unit 34 and the specimen holder cable 36 may be configured the same as the detector motor drive unit 24 and the detector drive cable 50, though other configurations are also compatible with this invention. The specimen holder drive cable 36 is fed into the conduits of the moveable detector in-core flux mapping system through a "Y" connection 38 that communicates with the input to the five-path transfer device 28. One of the outputs of the five-path transfer device similarly feeds the input to the ten-path transfer device 30, one of the outputs 52 of which feeds a new three-path transfer device 40. One output of the three-path transfer device feeds a new specimen attachment point 42, at which a new specimen holder and specimen can be attached to the specimen holder drive cable; a second output of the three-path transfer device feeds a specimen holder catcher 44 in which the specimen holder can be offloaded; and a third output of the three-path transfer device provides a path to the core 54. It should be appreciated that while five-path, ten-path and three-path transfer devices are disclosed these devices may have as many paths as necessary to access the desired locations within the core and currently five-path and six-path devices 28 and ten-path and fifteen-path devices 30 are in use or planned for use, depending on the size of the core.

Figure 3:
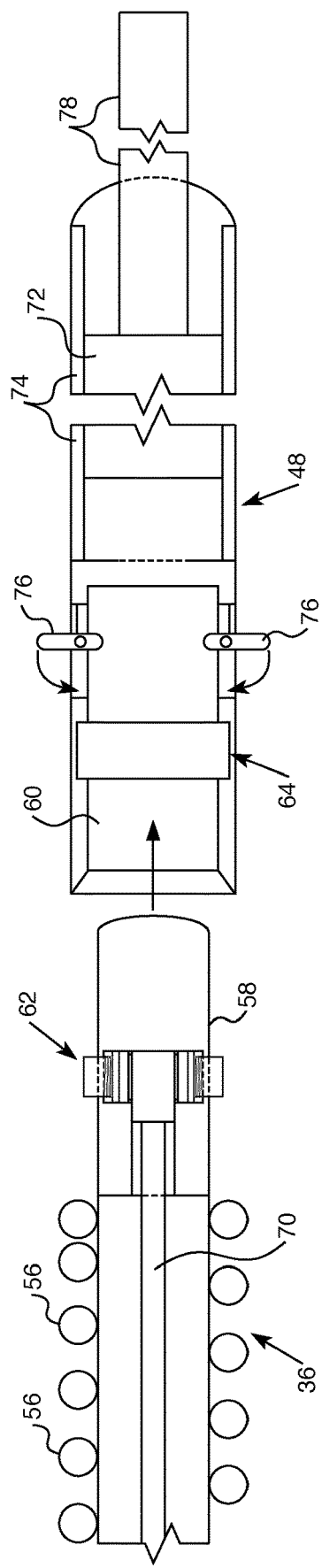
FIG. 3 is a schematic cutaway view of one embodiment of the target holder drive cable assembly of this invention.
Figure 3A:
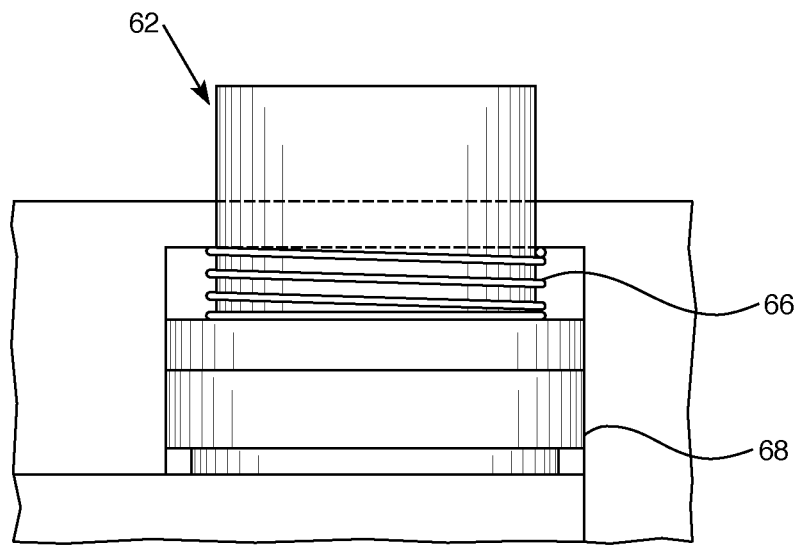
FIG. 3A is an enlarged view of the latch plug shown on the lead end of the specimen holder drive cable shown in FIG. 3.
Figure 3B:
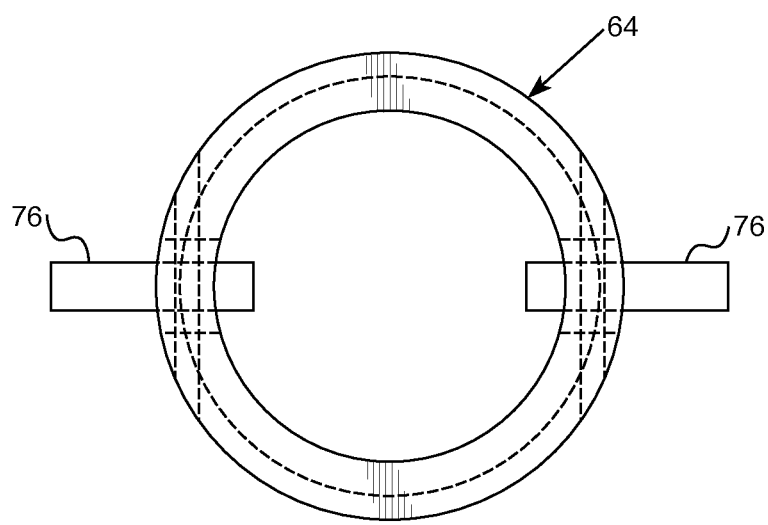
FIG. 3B is an end view of the trailing end of the specimen holder shown in FIG. 3.

FIG. 3 shows the lead end of the specimen holder drive cable 36 and the specimen holder 48. The specimen holder drive cable 36 has a spiral wire wrap 56 that mates with drive gears in the specimen holder drive motor unit 34 to advance and withdraw the specimen holder drive cable 36 through the conduits of the flux mapping system. At the lead end of the specimen holder drive cable 36 is a remotely operated male coupling component 58 that fits within a female coupling component 60 on the specimen holder 48. The male coupling component 58 has a remotely operated pneumatic latch plug 62 that when fully activated in its extended position fits within an annular groove 64 in the female coupling component 60. The latch plug 62 is shown in more detail in FIG. 3A, in the activated position, and includes an unlatching spring 66 that retracts the latch plug 62 when the pneumatic pressure supplied through the pneumatic fluid supply channel 70 is released. The pneumatic fluid is supplied from a pneumatic fluid supply reservoir 46, shown in FIG. 2, through the pneumatic fluid supply channel 70 that runs through the center of the specimen holder drive cable 36. A retaining clip 68 prevents the latch plug 62 from leaving the channel in which it travels. The specimen holder 48 has a payload chamber 72 that houses the specimen to be irradiated and two or more positioning tabs 76 that extend from an interior of the specimen holder housing 74, through the specimen holder housing and up against an interior surface of a fuel assembly instrument thimble in which the specimen holder 48 is to be inserted, to hold the specimen holder in position, by friction, when it is remotely disconnected from the specimen holder drive cable 36. The positioning tabs 76 are biased in a fully extended position and are rotated out of contact with the side walls of the instrument thimble by the male coupling component 58 when the male coupling component is fully inserted into the female coupling component 60. An end view of the positioning tabs 76 is shown in FIG. 3B. The specimen holder 48 also has an adjustable positioning cable 78 which extends out the lead end of the specimen holder 48. The desired axial position of the specimen within the instrument thimble is determined in advance of inserting the specimen into the moveable in-core detector flux mapping system and the length of the positioning cable 78 is adjusted so its lead end abuts the closed upper end of the instrument thimble when the specimen is at the desired position.

Thus, in between flux map runs, which are typically conducted once a quarter, the moveable in-core detector flux mapping system is available to insert isotopes into and harvest isotopes from all of the instrument thimbles in a reactor core accessible to the flux mapping system, so long as at least fifty percent of those thimbles are unoccupied at the time a flux map is to be run. Prior to a flux mapping run, the specimen holder drive cable 36 has to be withdrawn above the "Y" connection 38 to provide the miniature detector access to the five-path transfer device 28. Similarly, once a flux mapping run is completed, the miniature detector needs to be withdrawn above the "Y" connection to provide the specimen holder drive cable 36 access to the five-path transfer device 28. It should be appreciated that a typical reactor facility employing a moveable in-core flux mapping system has four, five or six parallel, interconnected trains of detectors whose detector drive cables can be run simultaneously so long as they are routed through different conduits to the core. In accordance with this invention each one of the detector trains can be provided with its own specimen holder cable drive unit that are individually programmed to plant isotopes at different desired locations within the core.

Thus, this invention provides modifications to an existing moveable in-core detector system and a method to perform the following functions that: (i) enables the insertion of specially configured specimens through a specially configured access to the existing multi-path transfer devices from one or more detector drive trains that enable the specimen to be inserted into a desired radial reactor core location that can be reached through the existing multi-path routing options; (ii) enables the specimen to be inserted into the desired available core location at a predetermined axial position inside the moveable in-core detector system instrument thimble relative to the top of the active fuel in the desired fuel assembly; (iii) enables the specimen holder drive cable to be disconnected from the specimen holder and withdrawn from the reactor above the multipath transfer devices with the axial position of the specimen in the reactor fixed by mechanical features on the specimen holder side of the specimen holder drive cable connector; (iv) enables the specimen holder drive cable to be inserted through a specific existing multi-path transfer device position selection to another specially configured transfer device, located downstream of the existing multi-path transfer devices (hereafter referred to as the lower path selector), that has a position that enables the specimen holder drive cable end to reach a location that enables the specimen holder drive cable to have another specimen holder payload attached; (v) enables a new specimen to be withdrawn above the existing multi-path transfer devices and then repeat the above steps 1 through 4 until all the desired specimens are "planted" in the reactor core as planned; (vi) enables the specimen holder drive cable to be inserted into a planted specimen location so that the mating portions of the specimen holder drive cable connector are brought together to enable the latching plugs on the drive cable side of the connector to be activated using a pneumatic fluid, such as nitrogen, to pressurize the pneumatic fluid supply channel so the latch plugs insert into the latch channel located on the specimen side of the connector so that the specimen holder can be withdrawn, or "harvested," following completion of the desired irradiation levels; (vii) enables the harvested specimen to be withdrawn through the ten-path selector device where the specimen holder latch to the drive cable is released by reducing the applied pneumatic fluid pressure, and then it is inserted through the lower path selector position that enables insertion of the specimen holder until it is captured by a device designed to coil the specimen holder with the specimen payload, to fit within the payload bay of a radioactive material transfer cask used for transportation of the specimen to a processing facility; (viii) enables the specimen holder cable to be positioned as described in step 4, above, and repeat steps 1 through 5 as desired; and (ix) enables steps 1 through 8 to be repeated as desired.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An irradiation target handling system having an isotope production cable assembly comprising:
a target holder drive cable (36) constructed to be compatible with conduits of an existing nuclear reactor moveable in-core detector system that conveys in-core detectors (12) from a detector drive unit (24) to and through instrument thimbles within a reactor core (14), the target holder drive cable having a remotely controlled one of a male or female coupling (58) on a leading end of the drive cable;
a target holder drive cable drive motor unit (34) separate from and independent of the detector drive unit (24) on the existing nuclear reactor moveable in-core detector system and configured to drive the target holder drive cable (36) into and out of the core (14), wherein the target holder drive cable drive motor unit is structured to drive the target holder drive cable into and through the conduits, a first multipath selector (28) and a second multipath selector (30) on the existing nuclear reactor moveable in-core detector system;
a specimen target holder (48) having another of the male or female coupling (60) on a trailing end of the specimen target holder with the another of the male or female coupling configured to mate with the one of the male or female coupling (58) on the leading end of the target holder drive cable (36); and
a third multipath selector (40) structured to receive an input from an outlet path (52) on the second multipath selector (30) and provide a first output to a new specimen attachment location (42), a second output to an irradiated specimen offloading location (44) and a third output (54) to the core (14).

2. The irradiation target handling system of claim 1 wherein the specimen target holder (48) has a radial projection (76) extending from or through an outside wall of the specimen target holder into contact with an interior wall of an instrument thimble in the reactor core (14), into which the specimen target holder is driven by the target holder drive cable (36), which maintains an axial position of the specimen holder within the instrument thimble, when the specimen holder is detached from the drive cable.

3. The irradiation target handling system of claim 2 wherein the one of the male or female coupling (58) is configured to move the radial projection (76) away from the interior wall of the instrument thimble when coupled to the another of the male or female coupling (60) on the specimen target holder (48).

4. The irradiation target handling system of claim 1 including an axial positioning device (78) attached to the specimen target holder (48) for determining when the specimen target holder achieves a preselected axial position within an instrument thimble within the core (14), which the specimen target holder is driven into by the drive cable (36).

5. The irradiation target handling system of claim 4 wherein the instrument thimbles have a closed upper end and the axial positioning device is an axial projection (78) on a leading edge of the specimen target holder (48), the axial projection sized to contact an interior of the closed upper end of the instrument thimble into which the specimen target holder is driven.

6. The irradiation target handling system of claim 5 wherein the length of the axial projection (78) is a wire having an adjustable length.

7. The irradiation target handling system of claim 1 wherein the target holder drive cable (36) enters the conduits through a "Y" connection with one leg of the "Y" connected to the target holder drive cable drive motor unit (34) and a second leg of the "Y" connected to the detector drive unit (24).

* * * * *